No. 870,110. PATENTED NOV. 5, 1907.
H. J. LAWRENCE.
CREAM SEPARATOR.
APPLICATION FILED JUNE 19, 1907.

WITNESSES:
C. F. Stewart
A. M. Rose

Henry J. Lawrence,
INVENTOR.

By C. A. Snow & Co.
ATTORNEYS

UNITED STATES PATENT OFFICE.

HENRY J. LAWRENCE, OF LONGBEACH, CALIFORNIA.

CREAM-SEPARATOR.

No. 870,110.  Specification of Letters Patent.  Patented Nov. 5, 1907.

Application filed June 19, 1907. Serial No. 379,806.

*To all whom it may concern:*

Be it known that I, HENRY J. LAWRENCE, a citizen of the United States, residing at Longbeach, in the county of Los Angeles and State of California, have invented a new and useful Cream-Separator, of which the following is a specification.

This invention has relation to cream separators and it consists in the novel construction and arrangement of its parts as hereinafter shown and described.

The object of the invention is to provide a simple and effective means for separating cream from milk.

The separator comprises an imperforated pan which snugly receives a pan provided with a perforated bottom. The perforations in the last said pan are of such size as to readily permit the passage of milk therethrough but to retard and check the passage of cream therethrough. The pan having a perforated bottom is adapted to nest within the imperforated pan and when in such position the perforated bottom rests upon the bottom of the outer pan, a scraper is pivoted at the center of the bottom of the perforated pan and extends radially to the edge of the said bottom and then up along the side of the said pan where its extremity is fastened into a handle. The said scraper is adapted to be turned within the perforated pan for the purpose of removing the cream therefrom before and after separation has taken place. To effect separation the pans are nested as above described and the milk and cream is poured into the pan having the perforated bottom. After it has been permitted to stand for a while in order that the milk and cream may assume different levels the inner pan is raised and the milk flows through the perforated bottom thereof into the outer pan while the cream is retained in the inner pan against the perforated bottom thereof.

Figure 1:
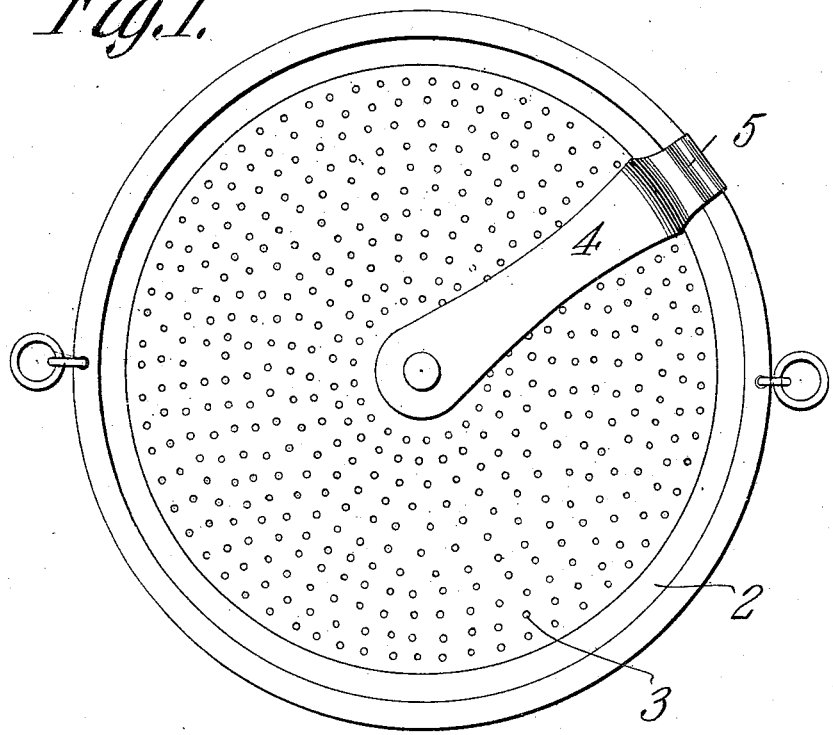
Figure 2:
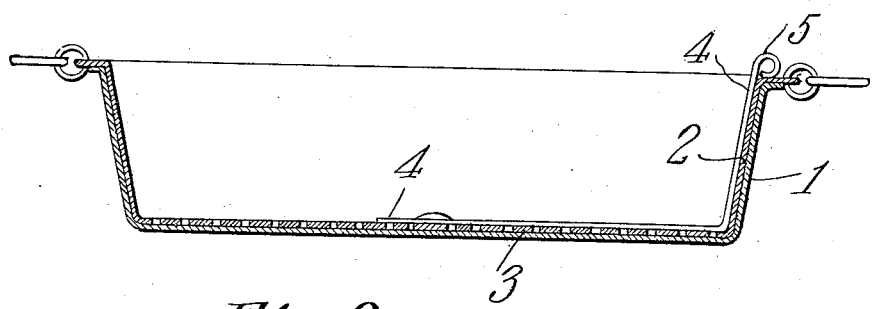

In the accompanying drawing:—Figure 1 is a top plan view of the separator, and Fig. 2 is a transverse sectional view of the same.

The separator consists of the imperforated outer pan 1. The inner pan 2 is adapted to nest within the outer pan 1 and fits snugly therein. The inner pan 2 is provided with a perforated bottom 3 which is adapted to rest directly upon the bottom of the pan 1. The scraper 4 is pivoted to the center of the bottom 3 and extends radially across the said bottom to the side of the pan, thence, up along the side of the pan and its upper extremity is fashioned into a handle 5. The said scraper is preferably made of sheet metal. Thus it will be seen that a simple and effective cream separator is provided and that the parts of the same may be easily and readily separated for cleansing and other purposes. Also a pivoted scraper is so mounted upon the perforated bottom of the inner pan as to effectually remove the hefty cream from the said bottom and from along the sides of the pan at a complete revolution of the said scraper.

Having described my invention what I claim as new and desire to secure by Letters-Patent is:—

A cream separator comprising an outer imperforated pan, an inner pan adapted to nest snugly within and fit closely against the inner surface of the outer pan and having a perforated bottom and a scraper pivoted to the bottom of the inner pan and extending radially thereof.

In testimony that I claim the foregoing as my own, I have hereto affixed my signature in the presence of two witnesses.

HENRY J. LAWRENCE.

Witnesses:
J. H. BROWN,
EDWARD H. LAWRENCE.